(12) United States Patent
Srivatsa et al.

(10) Patent No.: US 11,526,800 B2
(45) Date of Patent: Dec. 13, 2022

(54) DETERMINING VALUE OF CORPORA FOR MACHINE LEARNING USING CORESETS

(71) Applicant: International Business Machines Corporation, Armonk, NY (US)

(72) Inventors: Mudhakar Srivatsa, White Plains, NY (US); Shiqiang Wang, White Plains, NY (US); Joshua M Rosenkranz, White Plains, NY (US); Supriyo Chakraborty, White Plains, NY (US); Bong Jun Ko, Harrington Park, NJ (US)

(73) Assignee: International Business Machines Corporation, Armonk, NY (US)

( * ) Notice: Subject to any disclaimer, the term of this patent is extended or adjusted under 35 U.S.C. 154(b) by 614 days.

(21) Appl. No.: 16/415,120

(22) Filed: May 17, 2019

(65) Prior Publication Data
US 2020/0364613 A1 Nov. 19, 2020

(51) Int. Cl.
*G06N 20/00* (2019.01)

(52) U.S. Cl.
CPC .................................... *G06N 20/00* (2019.01)

(58) Field of Classification Search
CPC ........ G06N 20/00; G06N 20/10; G06N 20/20; G06N 5/00; G06N 5/02; G06N 5/04
See application file for complete search history.

(56) References Cited

U.S. PATENT DOCUMENTS

| | | |
|---|---|---|
| 8,176,088 B2 | 5/2012 | Rjaibi et al. |
| 8,375,030 B2 | 2/2013 | Rane et al. |
| 8,738,387 B2 | 5/2014 | Aggarwal et al. |
| 9,286,312 B2 | 3/2016 | Rus et al. |
| 10,055,135 B2 | 8/2018 | Guilford et al. |
| 2012/0232960 A1 | 9/2012 | Smith |
| 2017/0316346 A1 | 11/2017 | Park et al. |
| 2018/0137141 A1 | 5/2018 | O'Donnell |

(Continued)

OTHER PUBLICATIONS

Fan et al. "Communication Efficient Coreset Sampling for Distributed Learning", Jun. 2018, https://ieeexplore.ieee.org/abstract/document/8445769 (Year: 2018).*

(Continued)

*Primary Examiner* — Kamran Afshar
*Assistant Examiner* — Shoun J Abraham
(74) *Attorney, Agent, or Firm* — Patterson + Sheridan, LLP

(57) ABSTRACT

Method and apparatus for exchanging corpora via a data broker are provided. One example method generally includes receiving, at the data broker from a holder of a first corpus application, a coreset for the first corpus and transmitting the coreset to a set of data providers. The method further includes receiving, from a first data provider of the set of data providers, a value with respect to the coreset of a second corpus associated with the first data provider and transmitting, from the data broker to the holder of the first corpus, the value. The method further includes receiving, at the data broker from the holder of the first corpus, a request to receive the second corpus and receiving the second corpus from the first data provider. The method further includes validating the value of the second corpus and transmitting the second corpus to the holder of the first corpus.

20 Claims, 6 Drawing Sheets

(56) References Cited

U.S. PATENT DOCUMENTS

2019/0007163 A1 1/2019 Sun et al.
2019/0026489 A1 1/2019 Nerurkar et al.

OTHER PUBLICATIONS

Zhang et al. "Approximate Clustering on Distributed Data Streams", Apr. 2008 https://ieeexplore.ieee.org/abstract/document/4497522 (Year: 2008).*

Travizano et al. "Wibson: A Decentralized Data Marketplace", Dec. 2018 https://arxiv.org/pdf/1812.09966.pdf (Year: 2018).*

Reddi et al. "Communication Efficient Coresets for Empirical Loss Minimization", 2015 https://auai.org/uai2015/proceedings/papers/141.pdf (Year: 2015).*

Jia et al. "Towards Efficient Data Valuation Based on the Shapley Value" Feb. 2019 https://arxiv.org/pdf/1902.10275v1.pdf (Year: 2019).*

Li et al. "A Theory of Pricing Private Data" 2014 https://dl.acm.org/doi/pdf/10.1145/2691190.2691191 (Year: 2014).*

Ohsawa et al. "Data Jackets for Synthesizing Values in the Market of Data", 2013 https://www.sciencedirect.com/science/article/pii/S1877050913009459 (Year: 2013).*

Ghorbani et al. "Data Shapley: Equitable Valuation of Data for Machine Learning", 2019 http://proceedings.mlr.press/v97/ghorbani19c/ghorbani19c.pdf (Year: 2019).*

Hynes et al. "A Demonstration of Sterling: A Privacy-Preserving Data Marketplace", 2018 https://dl.acm.org/doi/pdf/10.14778/3229863.3236266 (Year: 2018).*

Niu et al., "Unlocking the Value of Privacy: Trading Aggregate Statistics over Private Correlated Data," KDD 2018, Aug. 19?23, 2018, London, United Kingdom, 10 pages.

Feldman et al.,"Coresets for Differentially Private K-Means Clustering and Applicatinos to Privacy in Mobile Sensor Networks," IPSN 2017, Apr. 2017, 13 pages.

Feldman et al., "Private Coresets," STOC'09, May 31-Jun. 2, 2009, 10 pages.

Bachem et al., "Scalable K-Means Clustering via Lightweight Coresets," KDD 2018, Aug. 19-23, 2018, 9 pages.

* cited by examiner

DETERMINING VALUE OF CORPORA FOR MACHINE LEARNING USING CORESETS

BACKGROUND

The present invention relates to machine learning, and more specifically, to corpora used to train machine learning models.

Effective machine learning depends on the quality and quantity of data available to be used in training machine learning models and verifying the performance of machine learning models. It may be beneficial, in some cases, to combine corpora of data to improve the sampling of data that can be used in training and verification. However, for a given corpus held by a first party, there are no existing methods for evaluating the value of an additional corpus held by a second party, without sharing the given corpus with the second party, or sharing the additional corpus with the first party. Because corpora of data may be very large, this sharing may involve significant costs in time, network resources, and data storage. Additionally, sharing such data may be undesirable due to privacy concerns. Therefore, systems and methods are needed to enable comparing the relative value of data corpora without sharing the data corpora themselves.

SUMMARY

According to one embodiment of the present invention, a method for exchanging corpora via a data broker is provided. The method generally includes receiving, at the data broker from a holder of a first corpus configured for use in training a machine learning application, a coreset for the first corpus, the coreset sharing a dimensionality with the first corpus and transmitting the coreset to a set of data providers. The method further includes receiving, from a first data provider of the set of data providers, a value with respect to the coreset of a second corpus associated with the first data provider and transmitting, from the data broker to the holder of the first corpus, the value. The method further includes receiving, at the data broker from the holder of the first corpus, a request to receive the second corpus and receiving the second corpus from the first data provider. The method further includes validating the value of the second corpus and transmitting the second corpus to the holder of the first corpus.

DETAILED DESCRIPTION

Figure 1:
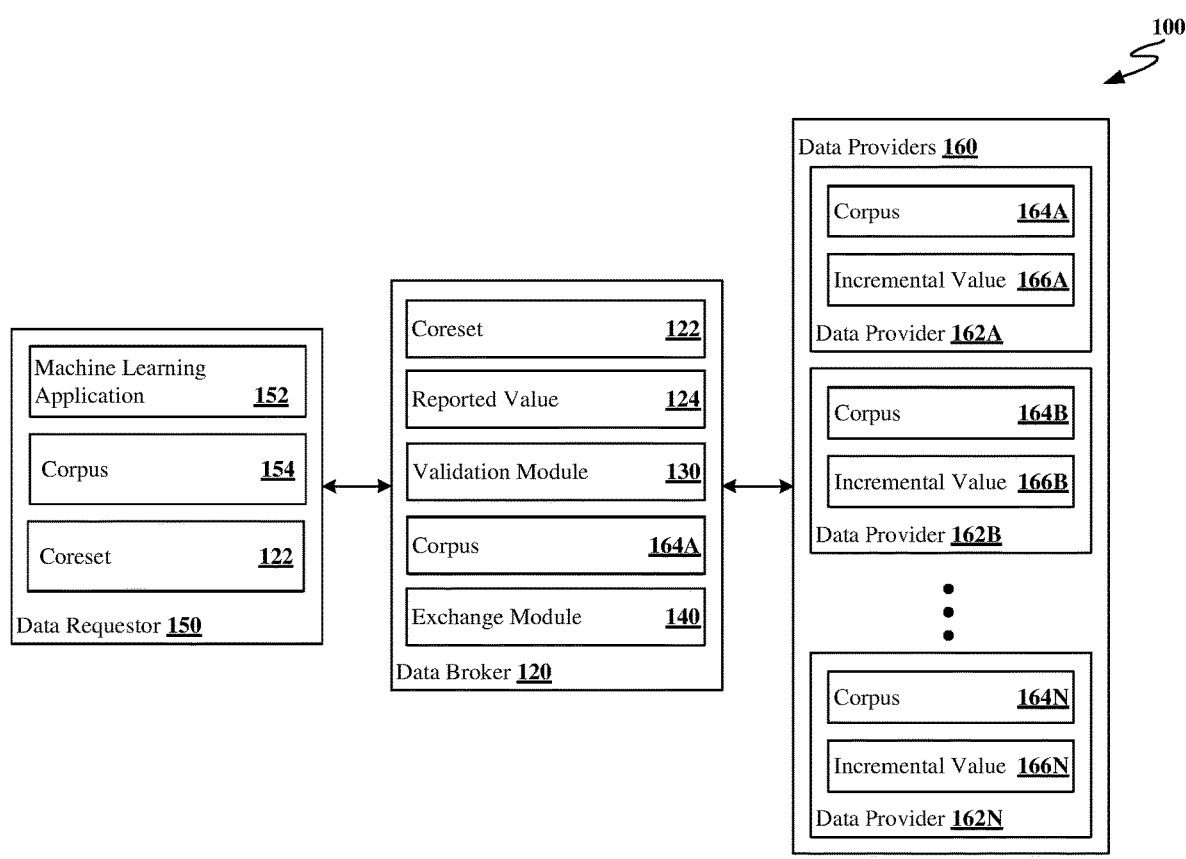
FIG. 1 is a block diagram of an example computing environment for corpora exchange via a data broker.

A corpus (e.g., a collection of documents or other text-based data structures) may have a certain implicit value for machine learning purposes. Adding additional data, for example joining a first corpus with a second corpus, may improve the value of the combined corpora. In machine learning, the value of a base corpus (e.g., the value of corpus P alone) subtracted from the value of a combined corpus (e.g., the value of corpus Q combined with corpus P) can be called the incremental value of a corpus added to the base corpus. That is, the incremental value of corpus Q given corpus P is the difference between the value of (Q+P) and the value of P. In this context, the value of corpora may correspond to the eventual performance of a machine learning model trained using the corpora. Performance of machine learning models may be evaluated using various key performance indicators (KPIs).

Existing methods provide no practical way to judge the incremental value of a corpus without one party first sharing its corpus with another party holding its own corpus (or vice versa) so that the combined corpora may be tested for incremental value in machine learning models. However, sharing large datasets can be costly, given the time, network resources, and storage capacity needed to do so. Because of this, an entity interested in obtaining additional data (e.g., via an additional corpus) may be forced to purchase the additional data (e.g., the additional corpus or corpora) without any foreknowledge of the actual value of the additional data. This has generally disincentivized parties needing data for machine learning purposes from sharing data with one another, which in-turn causes entities engaging in machine learning to independently collect their own data, rather than relying on available corpora from other sources.

In order to enable a corpus holder to determine the incremental value of an additional corpus or corpora, a method employing a data broker and coresets may be used. A coreset is a weighted data summary (e.g., a set of vectors and a corresponding weight representing the relative significance of each vector) of a corpus that is in the same sample space as the corpus. A coreset can be used as a proxy of the corpus for valuation purposes, which is much smaller in size, and therefore much easier to share. In general, the data broker can receive a request from a corpus holder, along with a coreset for the corpus in question, and broadcast the coreset to a set of data providers. The data providers can report the incremental value of their corpora to the data broker, which can then present exchange options to the original corpus holder. Then, the data broker can facilitate an exchange between the corpus holder and the data providers, including validating the reported value of the data providers' corpora. This process can be performed without the corpus holder needing to provide the corpus to either the data broker or the data providers. Rather, only the coreset is provided.

For example, consider company A is a corpus holder engaging in weather prediction using machine learning models. Company A has a corpus of weather data (e.g., a collection of weather observations such as temperature, humidity, wind speed, etc. at particular locations and times), but additional weather data may improve the quality of weather prediction by company A's machine learning model by additional training. Company A can create a coreset for the corpus of weather data and transmit the coreset to a data broker as part of a request for additional weather data. The data broker can broadcast the coreset to a group of data providers enrolled with the data broker, such as other companies or organizations that collect weather data. Broadcasting the coreset allows the data providers to calculate an incremental value of their corpora given the corpus of weather data. The data providers who perform this calculation can then report the value of their corpora to the data broker.

In one example, a data provider, company B, reports an incremental value of an additional corpus it maintains. The data broker can present the additional corpus and the reported value to company A, and enable company A to obtain the additional corpus, such as by a purchase or license to use company B's corpus. If company A decides to do so, the data broker obtains the additional corpus from company B and validates the reported incremental value of the additional corpus. Although this validation can only be performed after transfer of the additional corpus, the costs associated with the transfer fall on company B rather than company A. Because a corpus validation failure would only occur because of an erroneous value reported by a data provider, (in this example company B), an entity seeking additional data (in this example, company A) bears no risk of wasted transfer costs in seeking out additional corpora, as such costs would be borne by the data provider that reported an incorrect value. After validating the reported incremental value, the data broker can transfer the additional corpus to company A, and complete the exchange between company A and company B.

Use of the above method enables entities seeking additional data (e.g., for machine learning applications) to share compact representations of their existing data (e.g., by way of a coreset) rather than sharing their entire dataset (e.g., a full corpus), thereby saving costs in computer hardware, network resources, and user time. Additionally, parties dealing with sensitive data can share coresets based on their underlying corpus that do not expose sensitive aspects of the data, but still represent a usable proxy for such data. Thus, use of the above method may allow data seekers who are unable or easily supplement their machine learning training data to do so, which in-turn can improve the training and performance of the machine learning applications trained on such data.

FIG. 1 is a block diagram of a computing environment 100 for data exchange via data broker 120. Computing environment 100 includes, in addition to data broker 120, data requestor 150 and data providers 160. In general, computing environment 100 can be used to transfer data, such as corpora 164A, 164B and 164N, from data providers 162A, 162B and 162N, respectively to data requestor 150.

Data broker 120 may be a computing device including at least a processor and a memory (not shown). In other examples, the functions of data broker 120 may be performed by a server or servers, or using a cloud computing system or other distributed computing system. In still other examples, the functions of data broker 120 may be performed by a software routine executing on other computing devices in computing environment 100, such as data requestor 150. In this example, data broker 120 may receive, store, and transfer various data between parties, including coreset 122, reported value 124 and corpus 164A. Data broker 120 may also executes various software routines, including validation module 130 and exchange module 140.

Data requestor 150 may be a computing device including at least a processor and a memory (not shown). In this example, data requestor 150 is associated with a corpus holder performing machine learning tasks. Thus, in this example, data requestor 150 includes a machine learning application 152, corpus 154 and coreset 122. Generally, machine learning application 152 is trained using corpus 154, which in this example is a collection of data, such as a collection of data vectors. Note that coreset 122 is shown at both data requestor 150 and data broker 120. In general, data requestor 150 generates coreset 122 and then transmits coreset 122 to data broker 120.

In general, data requestor 150 requests additional corpora to add to corpus 154 to enhance the performance of machine learning application 152. To do so, data requestor 150 may request additional corpora from data providers 160 via data broker 120. For example, if machine learning application 152 is used to perform weather prediction, corpus 154 may include vectors representing observed weather data for a particular day or time, such as temperature, humidity, wind speed, or other weather data. Further, a party associated with data requestor 150 may want additional data (e.g., additional corpora) to further train and refine its weather prediction model.

In this example, data providers 160 are a set of computing devices associated with various data holders. In this example, data providers 160 includes data provider 162A, 162B, and 162N, but in other examples more or fewer data providers may be available. Each data provider 162A-N in this example includes a corpus 164 and an incremental value 166. Further in this example, corpora 164A-N each include a collection data points, which may be similar to or the same as the data in corpus 154 of data requestor 150. For example, corpus 154 and corpora 164A-N may comprise weather data with similar or the same weather metrics recorded (e.g., temperature, humidity, etc.).

Returning to data broker 120, data broker 120 includes coreset 122, which is a weighted data summary of a corpus 154 provided by data requestor 150. Generally, the data points (such as vectors) of a coreset are plotted in a sample space identical to the data points of the corpus corresponding to the coreset. However, the coreset includes fewer data points within the sample space. In one example, a coreset may contain only data points which correspond to cluster heads or centroids of clusters within the corresponding corpus. Thus, in one example, a coreset may be made by running a clustering algorithm on a corpus and determining if the clusters capture a sufficient amount of variance in the original corpus. Clustering may be performed by a variety of different methods or algorithms, including centroid clustering approaches such as k-means clustering and mean-shift clustering as well as other clustering approaches such as density-based spatial clustering and hierarchical clustering. When using centroid clustering, the identified centroids, or cluster heads, of each cluster may be selected for inclusion in the coreset. Then, the centroids within the coreset may be weighted based on the clusters corresponding to each centroid.

For example, centroids with a higher density or more clustered points may be assigned a higher weight in the coreset than centroids with low densities or fewer clustered points. Other methods, such as principle components analysis and the like may also be used to make compact representations of an existing corpus. Thus, a coreset may be used as an approximation of the corresponding corpus in evaluating the corpus, but is smaller than the corpus, and so may be transferred and stored remotely at less cost than the corpus itself. The savings in transfer and storage for a coreset compared to a corpus are directly related to the size difference between the coreset and the corpus. That is, a coreset that is significantly smaller than the corpus it is based on will also be significantly less costly to transfer and store as compared to the corpus it is based on.

In this example coreset 122 is shown stored on data broker 120. However, generally, a corpus holder, such as an operator of data requestor 150, generates a coreset and transfers the coreset to a data broker. The example of FIG. 1 shows coreset 122 after generation and transfer by data requestor 150.

Generally, data broker 120 broadcasts coreset 122 to data providers 160. Then, each of data providers 160 independently calculates incremental value 166 for its respective corpus 164. Corpus values 166A, 166B, and 166N represent an incremental value of corpora 164A, 164B, and 164N, respectively, given coreset 122. In this case, reported value 124 corresponds to incremental value 166A as reported by data provider 162A. An example method for calculating corpus value with respect to a coreset is discussed in further detail below with respect to FIG. 4.

Data broker 120 also includes reported value 124. In this case, data provider 162A generates and transmits reported value 124 to data broker 120. In other cases, data broker 120 may receive multiple reported values from more than one data provider.

After receiving reported value 124, data broker 120 transmits reported value 124 to data requestor 150, allowing the corpus holder associated with data requestor 150 to decide whether or not to initiate an exchange for the corpus associated with reported value 124. If the corpus holder decides to initiate the exchange, data broker 120 requests the corresponding corpus (corpus 164A) from data provider 162A. Then, using validation module 130, data broker 120 validates reported value 124. In general, data broker 120 re-calculates the incremental value of corpus 164A given coreset 122, to determine if the value reported by data provider 162A is accurate. Generally, reported value 124 may be validated if the incremental value re-calculated by data broker 120 is within a specified range greater than or less than reported value 124. If reported value 124 is validated, data broker 120 performs an exchange of corpus 164A and payment from data requestor 150. Thus, data requestor 150 can obtain corpus 164A to combine with corpus 154, without having to transfer corpus 164A itself.

In this case, a single reported value is shown at data broker 120. However, in other examples, data broker 120 may receive a reported value from each of a plurality of data providers, and allow the corpus holder of data requestor 150 to select one or more corpora to initiate an exchange for.

Figure 2:
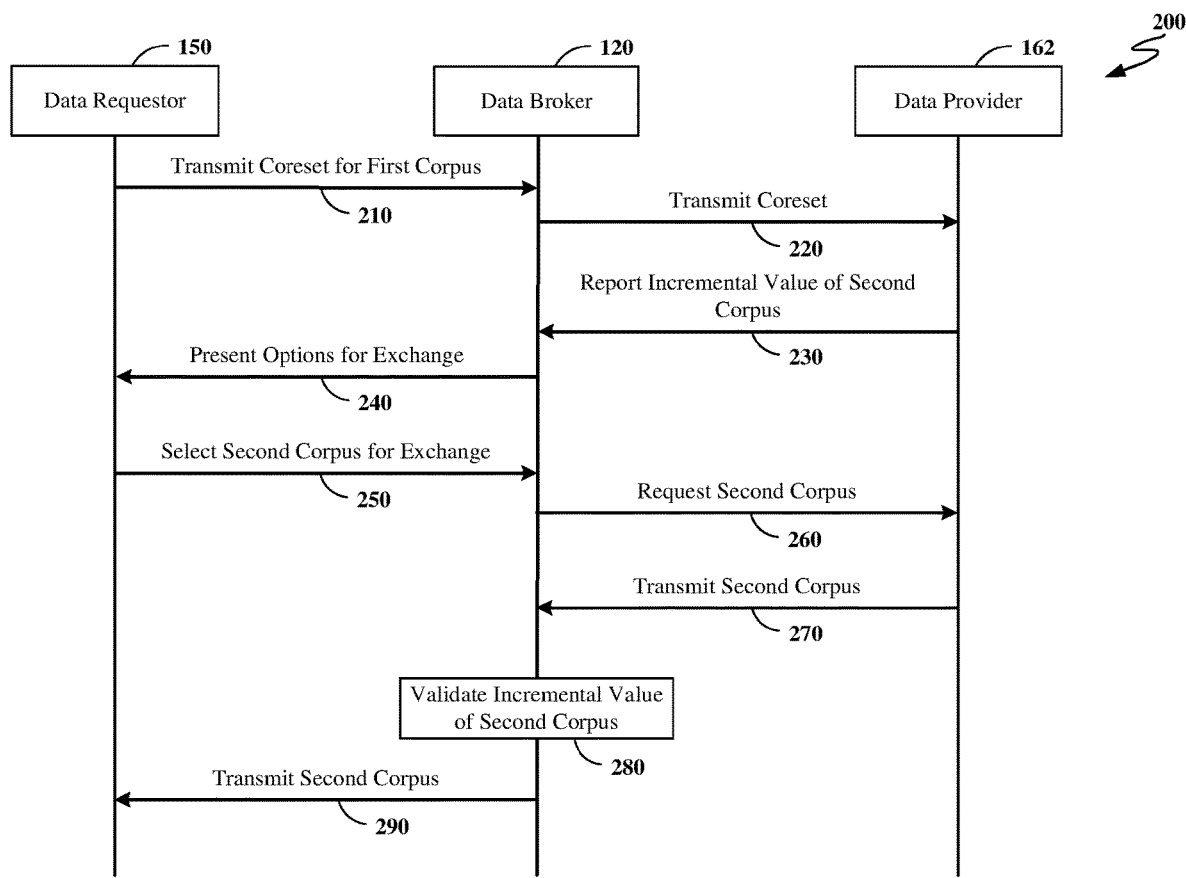
FIG. 2 is a flow diagram of an example process for corpora exchange via a data broker.

FIG. 2 is a flow diagram of an example process 200 for data exchange via a data broker. Process 200 involves data requestor 150, data broker 120 and data provider 162 of FIG. 1.

Process 200 begins at 210, where data requestor 150 transmits a coreset for a first corpus to data broker 120. Generally, data requestor 150 may generate the coreset by clustering the data (e.g., vectors) of the first corpus, including the centroids or cluster heads resulting from that clustering in the coreset, and weighting the centroids or cluster heads according to the characteristics of the clusters corresponding to the centroids or cluster heads. The resulting coreset can be used as an approximation of the first corpus for various calculations, including calculating the incremental value of other corpora to the first corpus. Because the coreset is smaller than the first corpus, transmission of the coreset uses less network resources (e.g., bandwidth) than transmission of the first corpus would, and storage of the coreset at data broker 120 requires less storage space than storage of the first corpus would.

At 220, data broker 120 transmits the coreset to data provider 162. While the transmission at 220 is to a single data provider 162 in this example for simplicity, the action at 220 may be a transmission to multiple data providers (e.g., a broadcast), such as shown in FIG. 1. Because the first corpus is not transmitted to the data broker 120, data broker 120 does not validate the relationship between the first corpus and coreset 122 before transmitting coreset 122.

At 230 data provider 162 reports an incremental value for a second corpus held by data provider 162 to data broker 120. In general, data provider 162 may determine the incremental value of the second corpus given the coreset. This determination may be used as a proxy for determining the value of the second corpus given the first corpus, that is, the increase in value (e.g., as machine learning data) that would result from combining the first corpus and the second corpus.

At 240, data broker 120 present options for possible corpus exchange to data requestor 150 based on reports of incremental value received by data providers including the reported incremental value of the second corpus received from data provider 162. The options presented to data requestor 150 may include additional data, such as a size of corpora associated with the reports of incremental value, or information of the data providers holding the corpora.

In this example, at 250, data requestor 150 selects the second corpus for exchange based on the reported incremental value of the second corpus. In other cases, data requestor 150 may select a different corpus for exchange from a different data provider (not shown) or may choose to not select any corpus for exchange. In general the selection of the second corpus for exchange is communicated by a transmission from data requestor 150 to data broker 120. By selecting the second corpus for exchange, data requestor 150 initiates an exchange for the second corpus via data broker 120.

At 260 data broker 120 requests the second corpus from data provider 162 in order to process the exchange initiated by data requestor 150. Thereafter, at 270, data provider 162 transmits the second corpus to data broker 120.

At 280 data broker 120 validates the reported incremental value of the second corpus. In general, to ensure the value provided by the data provider is accurate, data broker 120 determines the value of the second corpus given the coreset, before exchanging the second corpus for payment from data requestor 150. In other cases data broker 120 may instead provide contact information for data requestor 150 and data provider 162 to each other, so that transfer of payment may be made between data requestor 150 and data provider 162 directly. To perform this determination, data broker 120 requires access to both the coreset and the second corpus. Thus, although the second corpus (which may be of considerable size) must be transferred to data broker 120 before validation can occur, the costs of a validation failure (e.g., network, time and storage costs of transferring the second corpus) fall on data broker 120 and data provider 162 rather than the corpus holder of data requestor 150. This risk-shifting may allow the corpus holder to seek out additional corpora more frequently than corpus holders do using existing corpora exchange methods.

At 290, after validating the incremental value of the second corpus, data broker 120 transmits the second corpus to data requestor 150. Thereafter data requestor 150 may freely use the second corpus, such as by combining the first corpus and the second corpus. The resulting combined corpus can be used in machine learning applications of the data requestor 150, or computing devices associated with the data requestor. By combining a second corpus with high incremental value to the first corpus, the resulting performance of the machine learning application may be improved.

Figure 3:
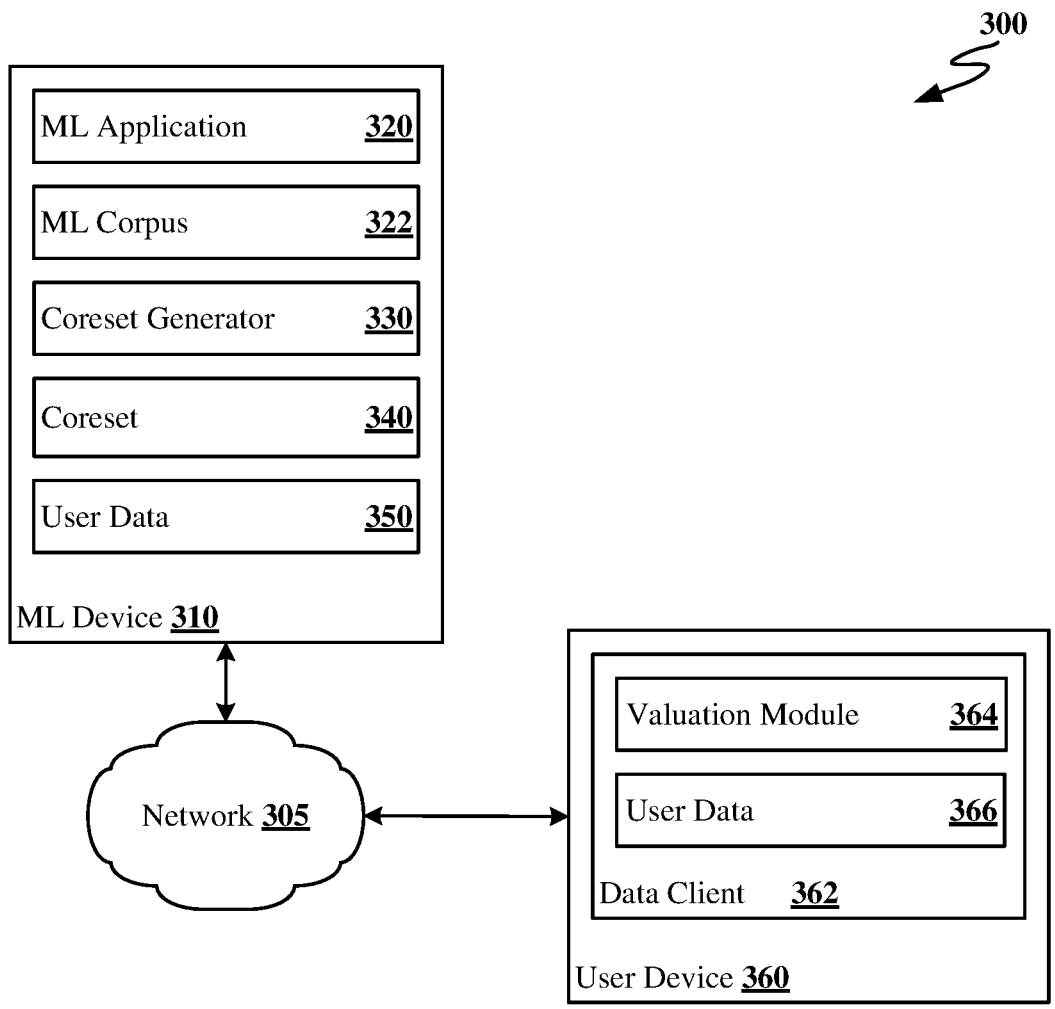
FIG. 3 is a block diagram of an example computing environment, according to one embodiment of the disclosure.

FIG. 3 is a block diagram of an example computing environment 300, according to one embodiment of the disclosure. Computing environment 300 is another possible embodiment wherein the functions of data requestor 150 and data broker 120 of FIG. 1 are performed by a single device, in this case machine learning (ML) device 310. Computing environment 300 includes ML device 310 and user device 360, connected via network 305.

ML device 310 stores and transmits various data files, including ML corpus 322, coreset 340 and user data 350. ML device 310 is also used to execute various software routines or modules, including coreset generator 330. ML device 310 also includes ML application 320, which is software module for machine learning, including machine learning-related data and routines, such as a machine learning algorithm, a trained machine learning model, a cost function routine, a cost optimization module or other components. Machine learning (ML) application 320 uses ML corpus 322, for training or validation purposes. In this example, ML device 310 is used to train and execute a machine learning model of ML application 320 that is trained using ML corpus 322.

User device 360 may be a computing device, such as a desktop computer, laptop computer, cellphone, tablet or other mobile device. A single user device 360 is shown in this example, but other examples may include a plurality of additional user devices. User device 360 includes data client 362, a software routine executing locally on user device 360 which can communicate with ML device 310 via network 305. Data client 362 in-turn includes valuation module 364 and user data 366.

In this example ML device 310 attempts to supplement ML corpus 322 using data obtained from user device 360. To do so, ML device 310 uses coreset generator 330 to generate coreset 340. Coreset generator 330 is a software routine executing on ML device 310 which can perform a clustering operation on a corpus to identify clusters of data points within the corpus. Coreset generator 330 then selects points representing each identified cluster for inclusion in a coreset representing the corpus. For example, if coreset generator 330 performs a centroid clustering method, such as k-means clustering, coreset generator 330 may select the centroid of each cluster for inclusion in the coreset. After selecting the data points in the coreset, coreset generator 330 determines a weight for each data point, based on the characteristics of the cluster associated with each data point, as discussed above.

In this example, coreset generator 330 clusters the data points of ML corpus 332 using k-means clustering, and identifies the centroids of each resulting cluster. Coreset generator 330 then determines a weight for each centroid, and stores the weighted centroids in coreset 340. Coreset 340 can then be used as an approximation of ML corpus 322 for calculating incremental values of other corpora with respect to ML corpus 322.

After coreset 340 is generated, ML device 310 transmits coreset 340 to data client 362. Data client 362 then calculates an incremental value for user data 366 given coreset 340. Data client 362 calculates the incremental value using valuation module 364, a software subroutine of data client 362. In general, valuation module 364 compares an estimated value of coreset 340 alone with an estimated value of coreset 340 combined with user data 366. The difference between these two estimated values is the incremental value for user data 366 given coreset 340, which can be used as a proxy for the incremental value for user data 366 given ML corpus 322. Specific techniques for calculating the incremental values of corpora are discussed below with respect to FIG. 4.

After calculating the incremental value for user data 366, data client 362 may prompt the user of user device 360 if the user wants to perform an exchange with ML device 310 (e.g., selling user data 366 to the owner of ML device 310). If the user agrees to the exchange, data client 362 transfers user data 366 to ML device 310, shown as user data 342. Thereafter, ML device 310 may add user data 350 to ML corpus 322, and then retrain the machine learning model of ML application 320 using the updated ML corpus 322.

For illustration consider the following example, using computing environment 300. ML device 310 is owned by an entity that performs machine learning tasks using weather data, such as weather prediction. ML corpus 322 would then correspond to the weather data that has been collected by ML device 310 so far. Because the quality of weather prediction may improve with more weather data to train the weather prediction model, the owner of ML device 310 may seek to obtain additional weather data from a plurality of other sources. In this case, by generating coreset 340 and transmitting coreset 340 to broker clients such as data client 362, ML device 310 enables broker clients to calculate the value of a particular user's weather data, and initiate an exchange if the user's weather data is high value (e.g., is weather data from an area not covered by ML corpus 322, or in a time-frame not covered by ML corpus 322).

Using this process, ML device 310 can obtain additional weather data to improve weather prediction without resorting to publication of the weather data in ML corpus 322, or transferring the entirety of ML corpus 322 to user devices such as user device 360. Thus, use of this method may enable distributed data like weather data to be centrally collected and used. Valued exchanges for such data are impractical under exiting methods as data needs to be collected prior to valuation in such methods. This impracticality encourages machine learning entities to avoid distributed data. Thus, use of this disclosure may enable distributed data to be collected (e.g., crowdsourcing data) in a way that is not currently possible.

Figure 4:
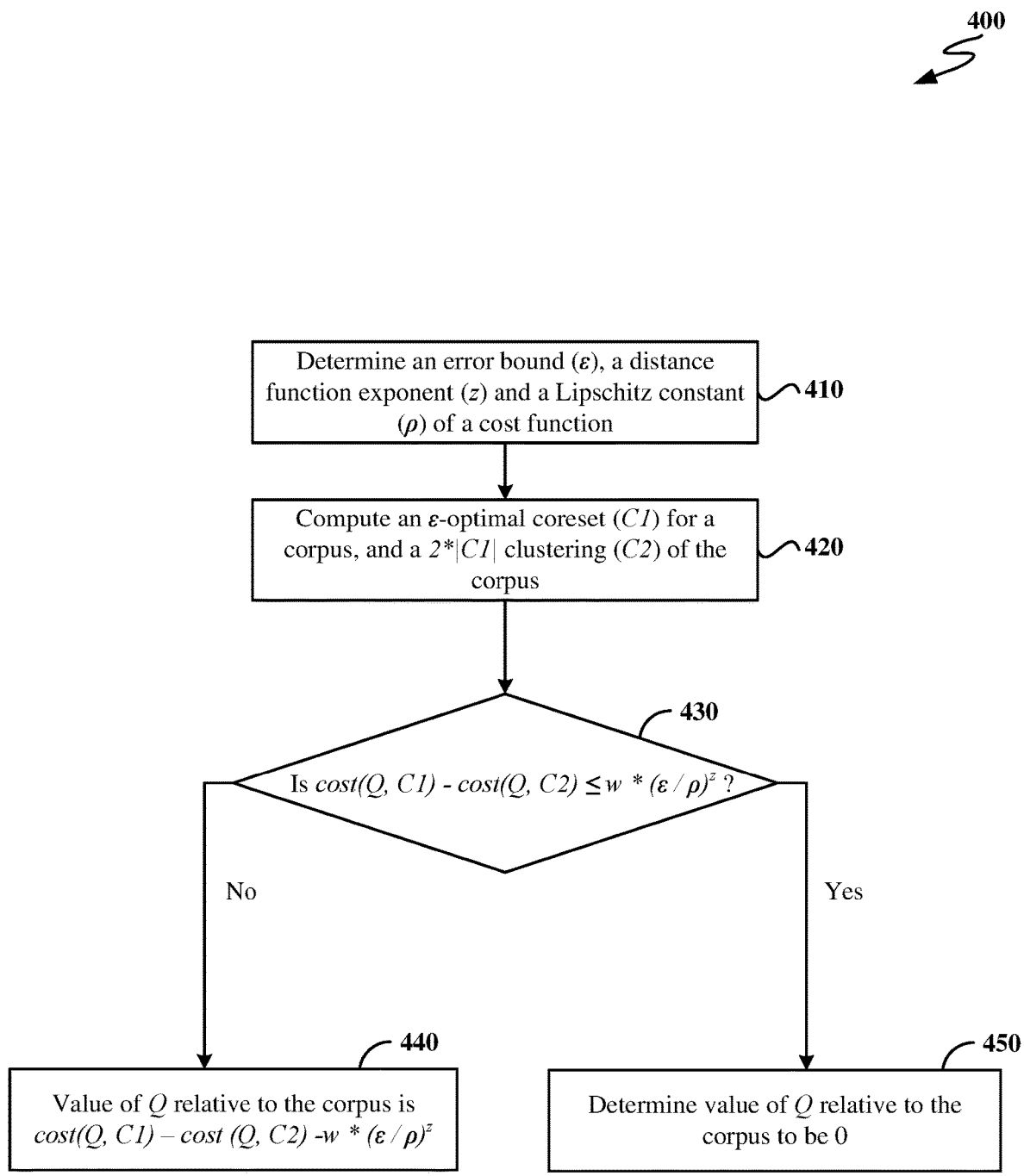
FIG. 4 is a flow diagram of an example method for determining the incremental value of a corpus.

FIG. 4 is a flow diagram of an example method 400 for determining the incremental value of a first corpus Q with respect to a coreset, the coreset corresponding to a second corpus P. Method 400 may be performed by a data broker, such as data broker 120 of FIG. 1. In other cases, method 400 may be performed by various data providers or on broker client software executing on user devices, such as described with respect to FIG. 3. Method 400 is performed with respect to a machine learning model, and a cost function, h( ), used in training the machine learning model.

Method 400 begins at 410, where the data broker determines three values for use in calculating the incremental value. First, the data broker determines an error bound ($\epsilon$) on h( ). The error bound $\epsilon$ represents the difference between using a coreset to train the machine learning model and using corpus P to train the machine learning model. Thus, $\epsilon$ corresponds to the loss in information when using a coreset instead of P.

Second, the data broker determines a distance function exponent (z) corresponding to the exponent used in a distance function used by the clustering algorithm used to generate a coreset for P. Generally, a distance function is used in centroid-based clustering to determine the distance between data points in the clusters. Typically, z is either 1 or 2, although other distance function exponents may be used in some circumstances.

Third, the data broker determines a Lipschitz constant (ρ) of h( ). A real-valued function f( ) is Lipchitz continuous if a Lipchitz constant exists such that, for any $x_1$ and $x_2$, $|f(x_1)-f(x_2)|$ is less than or equal to the Lipchitz constant multiplied by $|x_1-x_2|$. In this case, ρ is the Lipchitz constant for h( ). There may be multiple possible values for ρ in some cases. If so, the smallest possible Lipschitz constant (sometimes called the "best" Lipschitz constant) for h( ) may be used as ρ.

At 420, the data broker computes the ε-optimal coreset (C1) for P, and a 2\*|C1| clustering (C2) of P. A ε-optimal coreset is a coreset for a corpus which optimizes ε, meaning the coreset minimizes the error loss of using the coreset in place of the corpus. As discussed above, a coreset may be generated by clustering the points of a corpus. C1 may be computed by the expression:

$$\text{opt}(P,k)-\text{opt}(P,2k) \leq w^*(\varepsilon/\rho)^z$$

Where, opt(P, k) is a function that optimally clusters P into k clusters, opt(P, 2k) is a function that optimally clusters P into 2k clusters, and w is smallest weight for a data point within P, if P is a weighted data set. If P is not a weighted set, a value of 1 is used for w. The result of opt(P, k) is C1, and the result of opt(P, 2k) is C2. If C1 satisfies the expression (that is, C1–C2 is less than or equal to $w^*(\varepsilon/\rho)^z$), then C1 is the ε-optimal coreset for P.

After computing C1, at 430, the data broker determines if cost(Q, C1)–cost(Q, C2) is less than or equal to a value expression of $w^*(\varepsilon/\rho)^z$. As used here cost(x, y) is the cost of clustering x using y. In this case cost(Q, C1) is the cost of clustering Q using C1, meaning clustering Q using the established centroids as stored in C1. Similarly, cost(Q, C2), is the cost of clustering Q using C2. A high value for cost(Q, C1) indicates that the data of Q has points beyond the existing clustered points of P and thus represents a significant addition to the data of P. The value expression $w^*(\varepsilon/\rho)^z$ represents the level of uncertainty introduced by calculating C1 in place of P. High values of $w^*(\varepsilon/\rho)^z$ indicate a relatively large uncertainty introduced by C1, and low values of $w^*(\varepsilon/\rho)^z$ indicate a relatively small uncertainty introduced by C1.

If cost(Q, C1)–cost(Q, C2) is greater than the value expression $w^*(\varepsilon/\rho)^z$, at 440 the data broker determines that the incremental value of Q relative to P is the difference between cost(Q, C1)–cost(Q, C2) and $w^*(\varepsilon/\rho)^z$. This is because, if cost(Q, C1)–cost(Q, C2) exceeds $w^*(\varepsilon/\rho)^z$, then cost(Q, C1)–cost(Q, C2) has a positive value exceeding the uncertainty introduced by substituting C1 for P, and thus the data broker can establish that Q has incremental value given P.

Conversely, if cost(Q, C1)–cost(Q, C2) is less than or equal to n $w^*(\varepsilon/\rho)^z$, at 450 the data broker determines the incremental value of Q relative to P is 0. This indicates that any incremental value of Q given P is within the uncertainty introduced by C1, and thus it cannot be established with high confidence that Q has incremental value given P.

Method 400 may correspond to the process of validating a reported value as discussed in FIG. 1 above. Additionally, method 400 may be performed by a data provider calculating an incremental value for a corpus before reporting that value to a data broker.

In some cases, instead of using cost(Q, C1)–cost(Q, C2)–$w^*(\varepsilon/\rho)^z$ as the incremental value for Q, the data broker may calculate the incremental value of Q as an inverted silhouette score for Q given C1. A silhouette score measures how tightly the data points in a corpus (e.g., Q) can be clustered using a set of centroids (e.g., C1). If the silhouette score for Q given C1 is high, it indicates a close match between Q and P overall, meaning Q has low incremental value. Thus, an inverted silhouette score (e.g., 1/silhouette (Q, C1)) translates low silhouette scores into high incremental value and high silhouette scores into low incremental value.

In still other cases, the data broker may determine the incremental value for Q to be the summed drift in centroids if clustering Q using the same number of clusters (k above) used to generate C1. That is, if Q is clustered into k clusters, the centroids of that resulting cluster can be called Q'. By summing the distance between each member c of C1 and each member q of Q', the total drift from a k-cluster of P to a k-cluster of Q can be determined. A high summed difference indicates a significant difference between Q and P, and thus, a high incremental value of Q given P.

Figure 5:
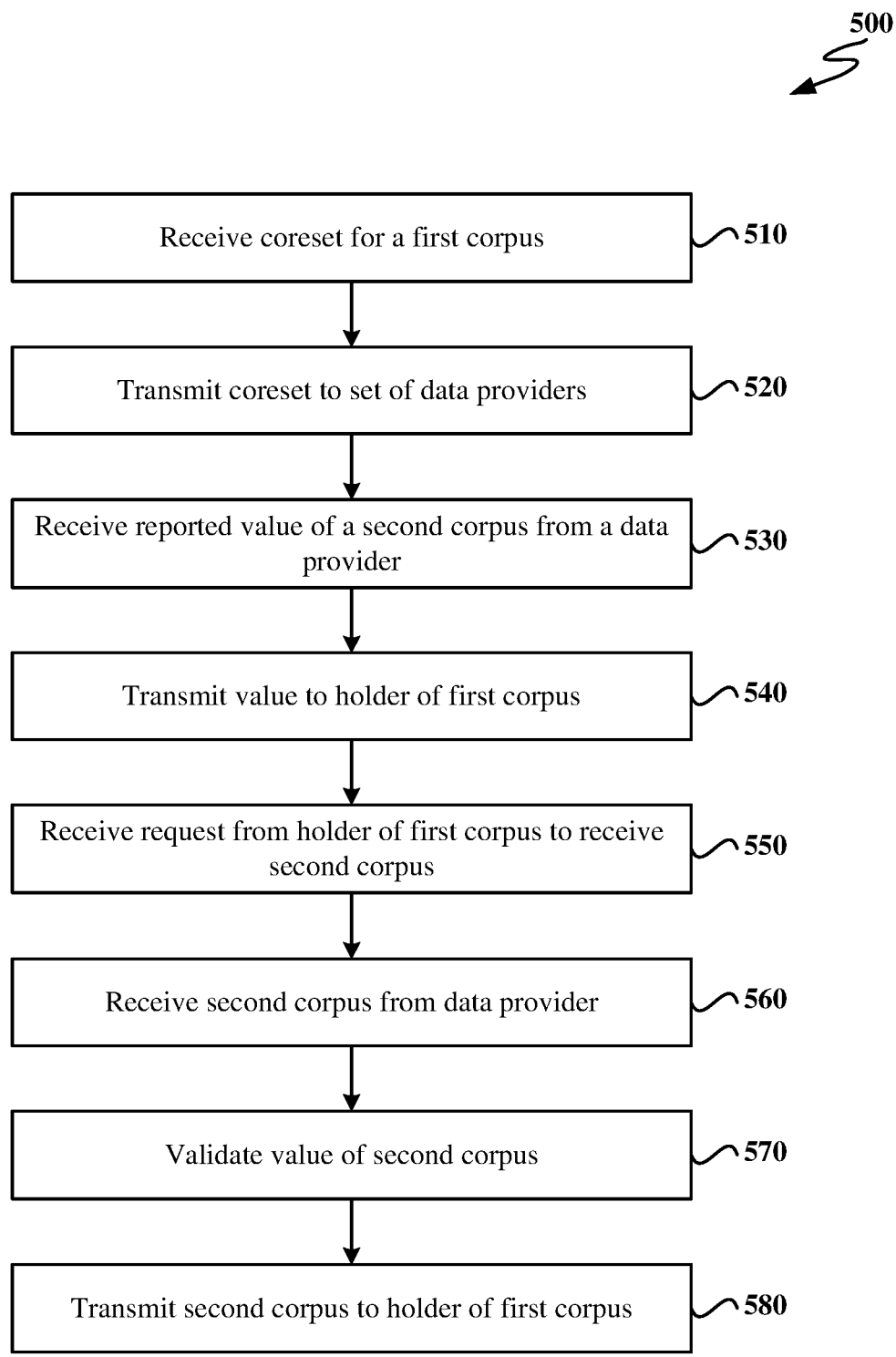
FIG. 5 is a flow diagram of an example method for exchanging a corpus via a data broker.

FIG. 5 is a flow diagram of an example method 500 for exchanging data (e.g., a corpus) via a data broker. Method 500 may be performed by a data broker such as data broker 120 of FIG. 1, or by other computing devices executing the data broker.

Method 500 beings at 510, where the data broker receives from a coreset for a first corpus, the coreset sharing a dimensionality with the first corpus, from a holder of the first corpus. In some cases the holder may use the first corpus for training a machine learning model or other tasks related to machine learning. In this case, sharing a dimensionality means the first corpus and the coreset are composed of vectors with equal numbers of dimensions. The coreset may be generated by the holder of the first corpus as described above, such that the coreset is a ε-optimal coreset for the first corpus. The coreset may be received from the holder of the first corpus as part of request to obtain corpora from data providers to combine with the first corpus.

At 520, the data broker transmits the coreset to a set of data providers. As discussed above, the data broker may broadcast the coreset to data providers, allowing the data providers to calculate an incremental value for their corpora. Typically, the set of data providers are a group of entities engaging in machine learning tasks and/or data collection that seek to sell their stored corpora of data. The set of data providers may be known to the data broker by registration with the data broker, or installation of a data broker client on computing devices of the set of data providers.

At 530, the data broker receives, from a first data provider of the set of data providers, a value of a second corpus associated with the first data provider based on the coreset received by the first data provider. In general, at this stage the data broker does not validate the value reported by the first data provider, as validating the value is not possible without access to the second corpus itself.

At 540, the data broker transmits the value received from the first data provider to the holder of the first corpus. In some cases, the data broker may receive a plurality of values associated with different corpora of different data providers all of whom received the coreset. In such cases, the data broker can present one or more corpus values to the holder of the first corpus to allow the holder of the first corpus to select a corpus. Based on this selection, the data broker can then initiate an exchange between the holder of the first corpus and the data provider.

At 550, the data broker receives a request from the holder of the first corpus to receive the second corpus from the first data provider. In general, the data requestor, or an operator thereof, may evaluate the value of the second corpus (and an associated price for exchange of the second corpus) to determine if the second corpus would be a worthwhile addition to the first corpus. If so, the data requestor initiates an exchange for the second corpus by requesting receipt of the second corpus from the data broker.

At 560, the data broker receives the second corpus from the first data provider. As discussed above, the second corpus may be a significant data set, potentially requiring high costs in transmission and storage. In this case, by transferring the second corpus to the data broker for validating first, the data requestor avoids transfer and storage costs if the value of the second corpus is not validated.

Thereafter, at 570, the data broker validates the value of the second corpus. As discussed above, validation of the value of the second corpus involves computing various values associated with the coreset and second corpus. If the value of the second corpus is validated, the data broker continues the initiated exchange. If the value of the second corpus is not validated, the data broker ends the initiated exchange.

At 580, the data broker transmits the second corpus to the holder of the first corpus. Thereafter, the holder of the first corpus can combine the first corpus and second corpus, and use the resulting combined corpus to perform various machine learning tasks, such as training a machine learning model, or verifying the output of the machine learning model.

In some cases, the data broker may establish an incremental value of the second corpus to validate the value of the second corpus. In such cases, validation involves determining a first cost of clustering the second corpus using the coreset, determining a second cost of clustering the second corpus using a doubled modification of the coreset, and determining a difference between the first cost and the second cost. In this case, a doubled modification refers to a second coreset that includes twice the number of clusters as the coreset. In the doubled modification of the coreset, the clusters may be smaller and thus each cluster may be more dense than in the coreset.

In such cases, method 500 may further involve identifying a cost function associated with the machine learning application, determining an error expression by dividing an error bound of the cost function by a Lipschitz constant of the cost function, and determining a value expression by multiplying a weight of the coreset with the error expression. Identifying a cost function associated with the machine learning application may be performed by the data broker receiving an identifier of the cost function from the holder of the first corpus. The difference between the first cost and the second cost can be a useful expression in determining incremental value.

In some examples of method 500, the data broker determines the difference between the first cost and the second cost is equal to the value expression, and determines the value of the second corpus is zero.

In other examples of method 500, the data broker determines the difference between the first cost and the second cost is less than the value expression, and determines the value of the second corpus is equal to the difference between the first cost and the second cost minus the value expression.

In still other examples of method 500, the data broker determines the difference between the first cost and the second cost is less than the value expression, and determines the value of the second corpus is equal to an inverse of a silhouette score for the second corpus with respect to the coreset.

In further examples of method 500, the data broker determines the difference between the first cost and the second cost is less than the value expression, and determines the value of the second corpus is equal to a summed drift of points of the coreset and corresponding points of a cluster of the second corpus.

In some cases of method 500, the coreset is generated by performing k-means clustering on the first corpus and the coreset is of smaller size than the first corpus.

Other examples of method 500 involve enabling an exchange between the holder of the first corpus and the first data provider and recording the exchange in a blockchain.

Figure 6:
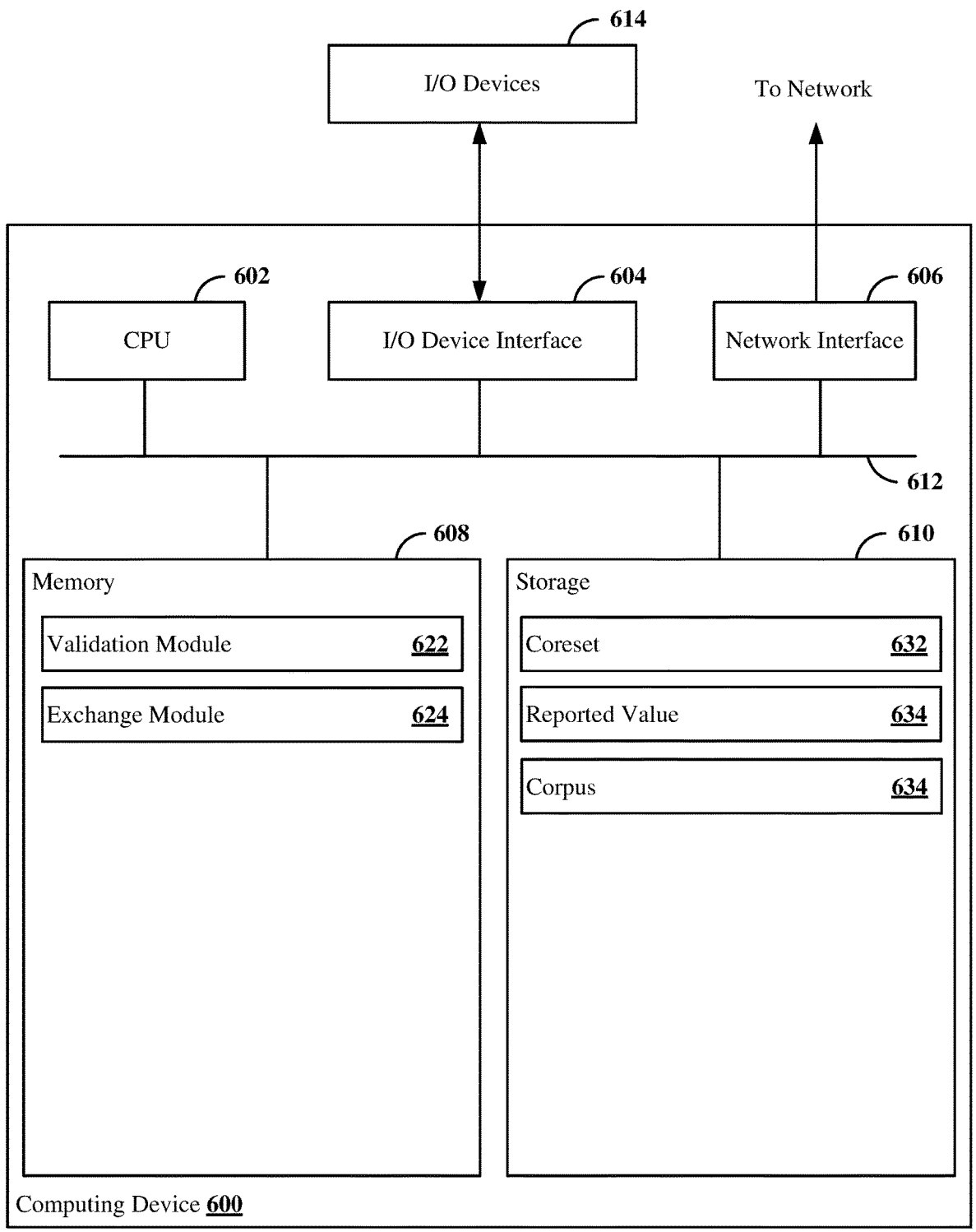
FIG. 6 is a block diagram of an example computing device.

FIG. 6 is a block diagram of an example computing device 600. As shown, computing device 600 includes a central processing unit (CPU) 602, one or more input/output (I/O) device interfaces 604, which may allow for the connection of various I/O devices 614 (e.g., keyboards, displays, mouse devices, pen input, etc.) to the computing device 600. Computing device 600 also includes network interface 606, memory 608, storage 610, and interconnect 612.

CPU 602 may retrieve and execute programming instructions stored in memory 608. Similarly, CPU 602 may retrieve and store application data residing in memory 608. Interconnect 612 allows for transmission of programming instructions and application data, among CPU 602, I/O device interface 604, network interface 606, memory 608, and storage 610. CPU 602 is included to be representative of a single CPU, multiple CPUs, a single CPU having multiple processing cores, and the like.

I/O device interface 604 may provide an interface for capturing data from one or more input devices integrated into or connected to computing device 600, such as keyboards, mice, touchscreens, and so on. Memory 608 may represent a random access memory (RAM), while storage 610 may be a solid state drive, for example. Although shown as a single unit, storage 610 may be a combination of fixed and/or removable storage devices, such as fixed drives, removable memory cards, network attached storage (NAS), or cloud-based storage.

As shown, memory 608 includes validation module 622 and exchange module 624. Validation module 622 and exchange module 624 are software routines executed based on instructions which may be stored in the storage 610. Such instructions may be executed by the CPU 602.

As shown, storage 610 includes coreset 632, reported value 634 and corpus 636. Generally, coreset 632 is received from a holder of a first corpus, via network interface 606. Computing device 600 transmits coreset 632 to one or more data providers, and receives reported value 634 in return from a first data provider. Then exchange module 624 initiates an exchange between the holder of the first corpus and the first data provider. After initiating the exchange, computing device 600 receives corpus 636 from the first data provider, and validation module 622 validates reported value 634 using coreset 632 and corpus 636. After validating reported value 634, computing device 600 transfers corpus 636 to the holder of the first corpus.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., a data broker) or related data available in the cloud. For example, a data broker could execute on a computing system in the cloud and exchange data, including machine learning corpora, between corpus holders and data providers. In such a case, the data broker could validate the value of a corpus and store coresets, corpora and associated data at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method comprising:
receiving, at a data broker from a holder of a first corpus configured for use in training a machine learning application, a coreset for the first corpus, the coreset sharing a dimensionality with the first corpus, wherein the machine learning application is associated with a cost function;
transmitting, from the data broker to a set of data providers, the coreset;
receiving, at the data broker from a first data provider of the set of data providers, an incremental value of a second corpus with respect to the first corpus, wherein the incremental value is calculated based at least in part on the coreset, and wherein the incremental value indicates an expected performance of a machine learning model trained using both the first and second corpora, as compared to a machine learning model trained using only the first corpus;
transmitting, from the data broker to the holder of the first corpus, the incremental value;
receiving, at the data broker from the holder of the first corpus, a request to receive the second corpus;
receiving, at the data broker from the first data provider, the second corpus;
validating, by the data broker, the incremental value of the second corpus, comprising determining a value expression based on a weight of the coreset and an error expression, wherein the error expression is determined based on an error bound of the cost function and a constant of the cost function; and
transmitting, from the data broker to the holder of the first corpus, the second corpus.

2. The method of claim 1, wherein validating the incremental value of the second corpus further comprises:
determining a first cost of clustering the second corpus using the coreset;
determining a second cost of clustering the second corpus using a doubled modification of the coreset; and
determining a difference between the first cost and the second cost.

3. The method of claim 2, wherein
the cost function associated with the machine learning application is identified;
wherein the error expression is determined by dividing the error bound of the cost function by the constant of the cost function, wherein the constant comprises a Lipschitz constant; and
wherein the value expression is determined by multiplying the weight of the coreset with the error expression.

4. The method of claim 3, wherein validating the incremental value of the second corpus further comprises:
determining the difference between the first cost and the second cost is less than the value expression; and
determining the incremental value of the second corpus is equal to the difference between the first cost and the second cost minus the value expression.

5. The method of claim 3, wherein validating the incremental value of the second corpus further comprises:
determining the difference between the first cost and the second cost is less than the value expression; and
determining the incremental value of the second corpus is equal to an inverse of a silhouette score for the second corpus with respect to the coreset.

6. The method of claim 3, wherein validating the incremental value of the second corpus further comprises:
determining the difference between the first cost and the second cost is less than the value expression; and
determining the incremental value of the second corpus is equal to a summed drift of points of the coreset and corresponding points of a cluster of the second corpus.

7. The method of claim 1, further comprising generating the coreset by performing k-means clustering on the first corpus, wherein the coreset is of smaller size than the first corpus.

8. The method of claim 1, further comprising:
based on transmitting the second corpus to the holder of the first corpus, establishing an exchange has occurred between the holder of the first corpus and the first data provider; and
recording the exchange in a blockchain.

9. A system comprising:
a processor; and
a memory coupled to the processor, wherein the processor is configured to:
receive, at a data broker from a holder of a first corpus configured for use in training a machine learning application, a coreset for the first corpus, the coreset sharing a dimensionality with the first corpus, wherein the machine learning application is associated with a cost function;
transmit, from the data broker to a set of data providers, the coreset;
receive, at the data broker from a first data provider of the set of data providers, an incremental value of a second corpus with respect to the first corpus, wherein the incremental value is calculated based at least in part on the coreset, and wherein the incremental value indicates an expected performance of a machine learning model trained using both the first and second corpora, as compared to a machine learning model trained using only the first corpus;
transmit, from the data broker to the holder of the first corpus, the incremental value;
receive, at the data broker from the holder of the first corpus, a request to receive the second corpus;
receive, at the data broker from the first data provider, the second corpus;
validate, by the data broker, the incremental value of the second corpus, comprising determining a value expression based on a weight of the coreset and an error expression, wherein the error expression is determined based on an error bound of the cost function and a constant of the cost function; and
transmit, from the data broker to the holder of the first corpus, the second corpus.

10. The system of claim 9, wherein, while validating the incremental value of the second corpus comprises, the system is further configured to:
determine a first cost of clustering the second corpus using the coreset;
determine a second cost of clustering the second corpus using a doubled modification of the coreset; and
determine a difference between the first cost and the second cost;
wherein the cost function associated with the machine learning application is identified;
wherein the error expression is determined by dividing the error bound of the cost function by the constant of the cost function, wherein the constant comprises a Lipschitz constant; and
wherein the value expression is determined by multiplying the weight of the coreset with the error expression.

11. The system of claim 10, wherein, while validating the incremental value of the second corpus comprises, the system is further configured to:
determine the difference between the first cost and the second cost is less than the value expression; and
determine the incremental value of the second corpus is equal to the difference between the first cost and the second cost minus the value expression.

12. The system of claim 10, wherein, while validating the incremental value of the second corpus comprises, the system is further configured to:
determine the difference between the first cost and the second cost is less than the value expression; and
determine the incremental value of the second corpus is equal to an inverse of a silhouette score for the second corpus with respect to the coreset.

13. The system of claim 10, wherein, while validating the incremental value of the second corpus comprises, the system is further configured to:
determine the difference between the first cost and the second cost is less than the value expression; and
determine the incremental value of the second corpus is equal to a summed drift of points of the coreset and corresponding points of a cluster of the second corpus.

14. The system of claim 9, wherein the coreset is generated by performing k-means clustering on the first corpus and wherein the coreset is of smaller size than the first corpus.

15. The system of claim 9, wherein the system is further configured to:
based on transmitting the second corpus to the holder of the first corpus, establish an exchange has occurred between the holder of the first corpus and the first data provider; and
record the exchange in a blockchain.

16. A computer program product for exchanging corpora via a data broker, the computer program product comprising:
a computer-readable storage medium having computer-readable program code embodied therewith, the computer-readable program code executable by one or more computer processors to:
receiving, at the data broker from a holder of a first corpus configured for use in training a machine learning application, a coreset for the first corpus, the coreset sharing a dimensionality with the first corpus, wherein the machine learning application is associated with a cost function;
transmitting, from the data broker to a set of data providers, the coreset;
receiving, at the data broker from a first data provider of the set of data providers, an incremental value of a second corpus with respect to the first corpus, wherein the incremental value is calculated based at least in part on the coreset, and wherein the incremental value indicates an expected performance of a machine learning model trained using both the first and second corpora, as compared to a machine learning model trained using only the first corpus;
transmitting, from the data broker to the holder of the first corpus, the incremental value;
receiving, at the data broker from the holder of the first corpus, a request to receive the second corpus;
receiving, at the data broker from the first data provider, the second corpus;
validating, by the data broker, the incremental value of the second corpus, comprising determining a value expression based on a weight of the coreset and an error expression, wherein the error expression is determined based on an error bound of the cost function and a constant of the cost function; and
transmitting, from the data broker to the holder of the first corpus, the second corpus.

17. The computer program product of claim 16, wherein validating the incremental value of the second corpus comprises:

determining a first cost of clustering the second corpus using the coreset;

determining a second cost of clustering the second corpus using a doubled modification of the coreset; and determining a difference between the first cost and the second cost wherein the cost function associated with the machine learning application is identified;

wherein the error expression is determined by dividing the error bound of the cost function by the constant of the cost function, wherein the constant comprises a Lipschitz constant; and wherein the value expression is determined by multiplying the weight of the coreset with the error expression.

18. The computer program product of claim 17, wherein validating the incremental value of the second corpus further comprises:

determining the difference between the first cost and the second cost is less than the value expression; and determining the incremental value of the second corpus is equal to the difference between the first cost and the second cost minus the value expression.

19. The computer program product of claim 17, wherein validating the incremental value of the second corpus further comprises:

determining the difference between the first cost and the second cost is less than the value expression; and determining the incremental value of the second corpus is equal to an inverse of a silhouette score for the second corpus with respect to the coreset.

20. The computer program product of claim 17, wherein validating the incremental value of the second corpus further comprises:

determining the difference between the first cost and the second cost is less than the value expression; and determining the incremental value of the second corpus is equal to a summed drift of points of the coreset and corresponding points of a cluster of the second corpus.

* * * * *

UNITED STATES PATENT AND TRADEMARK OFFICE
CERTIFICATE OF CORRECTION

| | | |
|---|---|---|
| PATENT NO. | : 11,526,800 B2 | Page 1 of 1 |
| APPLICATION NO. | : 16/415120 | |
| DATED | : December 13, 2022 | |
| INVENTOR(S) | : Mudhakar Srivatsa et al. | |

It is certified that error appears in the above-identified patent and that said Letters Patent is hereby corrected as shown below:

In the Specification

In Column 1, Line 3, below "MACHINE LEARNING USING CORESETS" insert:
-- STATEMENT OF GOVERNMENT INTEREST
This invention was made with government support under W911NF1630001 awarded by Army Research Office (ARO). The government has certain rights to this invention. --.

Signed and Sealed this
Thirtieth Day of May, 2023

Katherine Kelly Vidal
*Director of the United States Patent and Trademark Office*